(12) United States Patent
Sukthanker et al.

(10) Patent No.: US 10,235,718 B2
(45) Date of Patent: Mar. 19, 2019

(54) FUTURE RESOURCE FORECAST

(71) Applicant: PayPal, Inc., San Jose, CA (US)

(72) Inventors: Chetan Sukthanker, San Jose, CA (US); Michelle Serrano, San Jose, CA (US); April Van Scherpe, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 246 days.

(21) Appl. No.: 14/723,381

(22) Filed: May 27, 2015

(65) Prior Publication Data

US 2015/0348211 A1    Dec. 3, 2015

Related U.S. Application Data

(60) Provisional application No. 62/003,960, filed on May 28, 2014.

(51) Int. Cl.

| | |
|---|---|
| *G06Q 40/00* | (2012.01) |
| *G06Q 20/10* | (2012.01) |
| *G06Q 30/06* | (2012.01) |
| *G06Q 40/02* | (2012.01) |
| *G06Q 20/04* | (2012.01) |

(52) U.S. Cl.
CPC .............. *G06Q 40/12* (2013.12); *G06Q 20/04* (2013.01); *G06Q 20/10* (2013.01); *G06Q 30/06* (2013.01); *G06Q 40/02* (2013.01)

(58) Field of Classification Search
CPC ........ G06Q 30/06; G06Q 40/00; G06Q 20/10; G06Q 20/04; G06Q 40/02; G07F 19/00

USPC .......... 705/26.7, 35, 30, 40, 39, 36 R, 26.8; 235/379, 380
See application file for complete search history.

(56) References Cited

U.S. PATENT DOCUMENTS

| | | | | |
|---|---|---|---|---|
| 6,128,603 A | * | 10/2000 | Dent ...................... | G06Q 20/04 705/33 |
| 8,639,622 B1 | * | 1/2014 | Moore ................. | G06Q 20/405 705/35 |
| 9,317,835 B2 | * | 4/2016 | Calman ................. | G06Q 10/10 |
| 2002/0123949 A1 | * | 9/2002 | VanLeeuwen ......... | G06Q 40/00 705/35 |
| 2003/0009402 A1 | * | 1/2003 | Mullen .................. | G06Q 20/04 705/35 |
| 2006/0047588 A1 | * | 3/2006 | Lal ........................ | G06O 40/02 705/30 |

(Continued)

*Primary Examiner* — Olusegun Goyea
(74) *Attorney, Agent, or Firm* — Haynes and Boone, LLP

(57) ABSTRACT

Embodiments relate to methods and systems for providing specific GUIs based on real-time data and projected data, such as for management of financial resources in view of future resource forecasts. In an embodiment, a method comprises receiving, electronically by a processor, user data comprising financial source data, income data and expenses data. The method also comprises determining, electronically by the processor, spendable resources based on the received user data. The method also comprises receiving, electronically by the processor, user inputs via an interactive interface of a user device comprising desired expense information. The method further comprises determining, electronically by the processor, an impact of the desired expense information on the spendable resources. And the method also comprises causing to be displayed, electronically by the processor, content associated with the impact on the user device.

20 Claims, 15 Drawing Sheets

(56) References Cited

U.S. PATENT DOCUMENTS

| | | | | |
|---|---|---|---|---|
| 2007/0100749 | A1* | 5/2007 | Bachu | G06O 20/108 |
| | | | | 705/42 |
| 2007/0262137 | A1* | 11/2007 | Brown | G06Q 20/10 |
| | | | | 235/380 |
| 2008/0201269 | A1* | 8/2008 | Hollins | G06Q 40/00 |
| | | | | 705/36 R |
| 2008/0215496 | A1* | 9/2008 | Hockley | G06Q 40/02 |
| | | | | 705/36 R |
| 2008/0245854 | A1* | 10/2008 | Monden | G06Q 40/02 |
| | | | | 235/379 |
| 2009/0192913 | A1* | 7/2009 | Saito | G06Q 20/20 |
| | | | | 705/26.1 |
| 2009/0204538 | A1* | 8/2009 | Ley | G06F 3/04847 |
| | | | | 705/40 |
| 2012/0095887 | A1* | 4/2012 | Mullen | G06Q 20/04 |
| | | | | 705/30 |
| 2012/0197773 | A1* | 8/2012 | Grigg | G06Q 40/00 |
| | | | | 705/35 |
| 2012/0233015 | A1* | 9/2012 | Calman | G06Q 30/0633 |
| | | | | 705/26.8 |
| 2013/0103580 | A1* | 4/2013 | Ventura | G06Q 40/02 |
| | | | | 705/40 |
| 2013/0124376 | A1* | 5/2013 | Lefebvre | G06Q 20/102 |
| | | | | 705/34 |
| 2013/0222369 | A1* | 8/2013 | Huston | G06T 17/00 |
| | | | | 345/419 |
| 2013/0282542 | A1* | 10/2013 | White | G06Q 40/00 |
| | | | | 705/35 |
| 2014/0122310 | A1* | 5/2014 | Torrens | G06Q 40/02 |
| | | | | 705/35 |
| 2014/0258022 | A1* | 9/2014 | Zamer | G06O 30/0631 |
| | | | | 705/26.7 |
| 2014/0279442 | A1* | 9/2014 | Luoma | G06Q 20/3221 |
| | | | | 705/39 |

\* cited by examiner

< Add a New Expense

515 — Add expenses to make calculations accurate. Or, skip expenses for now

Category >

Name (optional)

How much?

How often?

Date of next payment?

Save

Next

FIG. 5A-1

Expenses

Rent
Monthly on the 1st    −$1400.00

Utilities
PG&E
Monthly on the 12th    −$170.00

AT&T
Monthly on the 12th    −$210.00

Car Payment
Every other Friday    −$200.00

Piano Lesson
March 16th    −$150.00

HULU
Monthly on the 29th    −$8.99

FIG. 5B-1

Income

My Paycheck
Every other Friday        $1500.00

Jill's Paycheck
Bi-Monthly on the
1st and 15th              $900.00

Child Support
Monthly on the 15th       $2175.00

FIG. 5B

< Add Income

Enter the money you earn so we can
help forecast, or skip income for now.

Primary Income           >

What for? (e.g. my paycheck)

How much?

How often?

Date of next payment?

Add more income          Next

FIG. 10

Home ≡ ⊕
My spendable money
$1650.00    Combined Balances
$350.45
until next
income on 4/14
+  • •
1032
Recently Cleared from Liquid
3/18 Rent $1667.48  Fix this?
3/17 Cable $80.00  Fix this?
3/14 Income $1200.00  Fix this?

FIG. 11

Banks  +
PAYPAL
Checking    🕒 $3789.92
x-5789
Checking       $1256.04
x-0978
Savings        $600.19
x-2777
WELLS FARGO
Checking       $912.88
x-5789
Checking       $---
x-0978
Savings        $119.78
x-2777

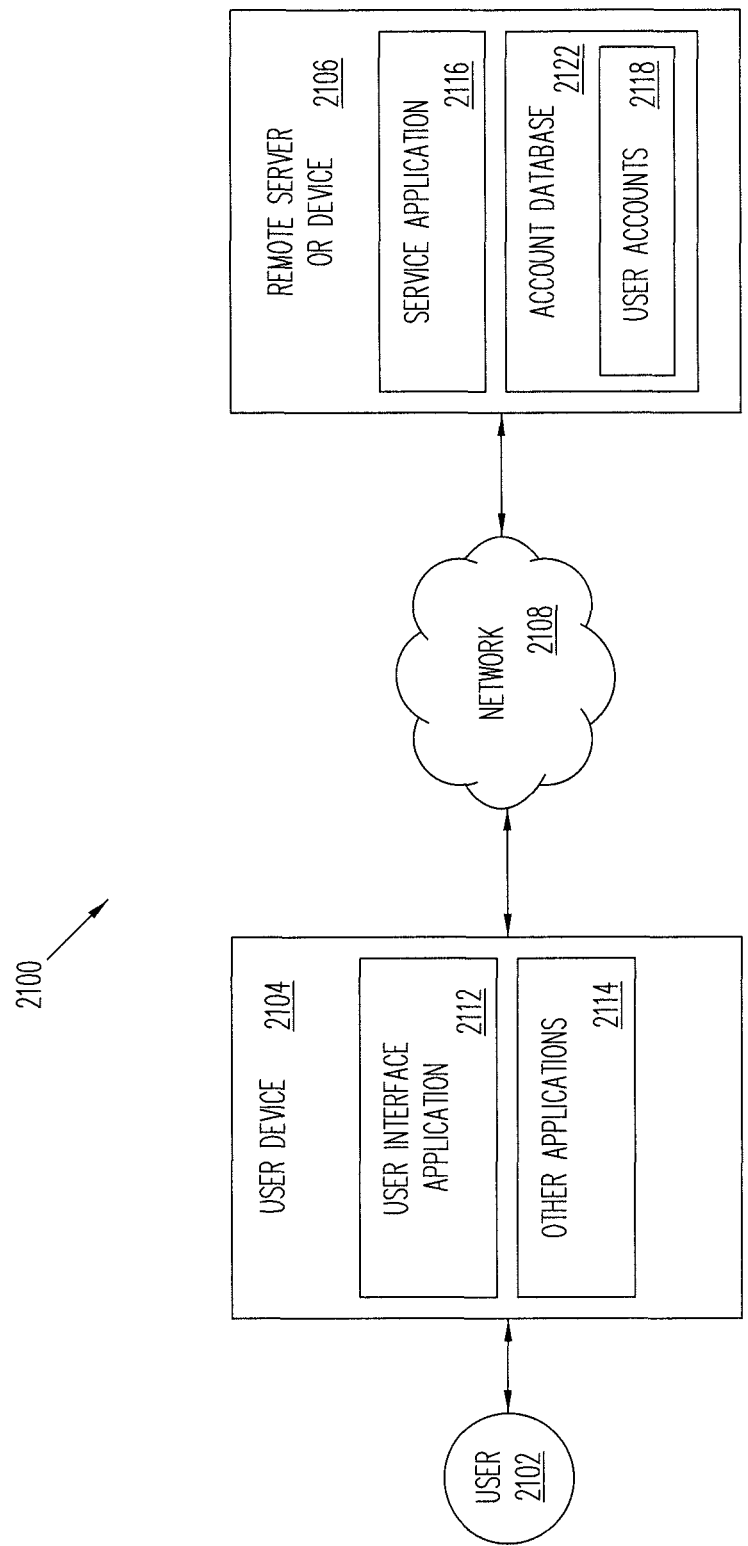

FUTURE RESOURCE FORECAST

CROSS REFERENCE TO RELATED APPLICATION

The present disclosure claims priority to and the benefit of U.S. provisional patent application No. 62/003,960 filed on May 28, 2014, the contents of which are incorporated herein by reference in their entirety.

BACKGROUND

Field of the Invention

Embodiments of the present disclosure generally relate to graphical user interfaces (GUIs) and, more particularly, to methods and systems for providing specific GUIs based on real-time data and projected data, such as for management of financial resources in view of future money forecasts.

Related Art

One way for users to regularly keep track or manage their financial resources is for the users to have spending budgets. A user device may track a user's daily dollars available in an account such as a checking or savings account. The user device may display such daily dollars available so that the users may spend their dollars up to an amount that is within their spending budgets.

BRIEF DESCRIPTION OF THE DRAWINGS

FIG. 3B shows a display of a user device illustrating a view for entering credentials associated with a funding source for an application for determining future resource forecasts according to one or more embodiments of the present disclosure.

FIG. 4 shows a display of a user device illustrating a view for choosing one or more accounts associated with a funding source for an application for determining future resource forecasts according to one or more embodiments of the present disclosure.

FIG. 5A shows a display of a user device illustrating a view for entering expenses for an application for determining future resource forecasts according to one or more embodiments of the present disclosure.

FIG. 5A-1 shows a display of a user device illustrating expenses entered for an application for determining future resource forecasts according to one or more embodiments of the present disclosure.

FIG. 5B shows a display of a user device illustrating a view for entering income information for an application for determining future resource forecasts according to one or more embodiments of the present disclosure.

FIG. 5B-1 shows a display of a user device illustrating income sources for an application for determining future resource forecasts according to one or more embodiments of the present disclosure.

FIG. 10 shows a display of a user device illustrating another example of a view of an application for determining future resource forecasts according to one or more embodiments of the present disclosure.

FIG. 11 shows a display of a user device illustrating a view of an application showing exemplary account balance details associated with various funding sources according to one or more embodiments of the present disclosure.

FIG. 17 illustrates a block diagram of a networked system suitable for implementing one or more processes described herein is illustrated according to an embodiment of the present disclosure.

Like reference numerals are used to identify like elements illustrated in one or more of the figures, wherein showings therein are for purposes of illustrating embodiments of the present disclosure and not for purposes of limiting the same.

Figure 2:
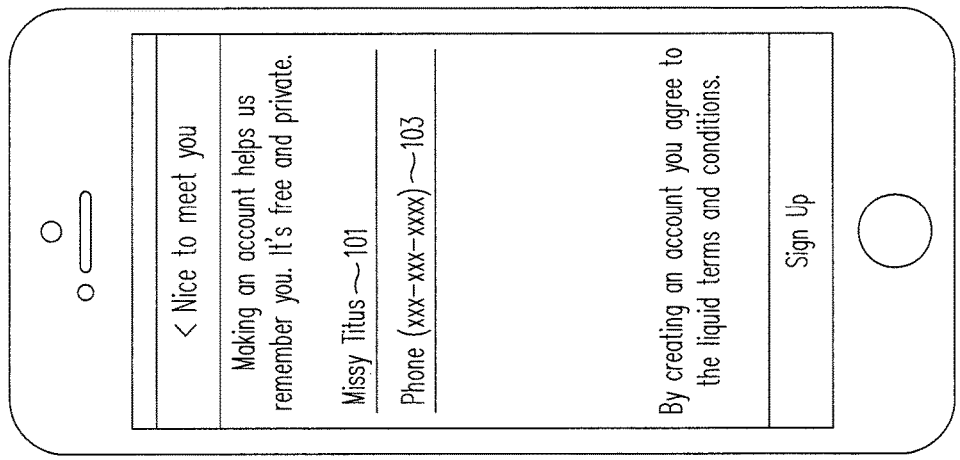
FIG. 2 shows a display of a user device illustrating a view for setting up authentication information for an application for determining future resource forecasts according to one or more embodiments of the present disclosure.

Embodiments of the disclosure and their advantages are best understood by referring to the detailed description that follows.

DETAILED DESCRIPTION

According to one or more embodiments of the present disclosure, methods and systems provide an interactive way for determining how an amount or expense may impact a future resource forecast, and for presenting specific content to a user on a display of a user device, such as a smart phone, so that the user can more easily make decisions based on budgets. In an embodiment, an application (App) may be downloaded on a user device. The application may provide an interactive interface so that a user may enter expense information such as an expense amount, the date of the expense, etc. to determine how the expense amount may impact a balance of available resources. In various embodiments, the application may display the balance of available resources including, for example, a daily money status. In this regard, the balance of available resources may be displayed according to different time frames, for example, how much money is available in an account until the next income or deposit of resources, or how much money is left in a current period of time such as how much money is left in the current month, week, etc. As a result, a user may be enabled to more accurately determine how an expense such as a trip, a large purchase or any other expense, may impact an account balance or fit into a budget. Specific or customized displays on the user device enable the user to more easily and efficiently enter data and view content.

As such, in embodiments herein, the application may provide the interactive interface on the user device so that the user may input any desired expense amount along with a date of the expense, and determine how the expense amount impacts the user's future resource forecast. In an example, a user may use the interactive interface to calculate how an expense may impact the user's account level until the next income (e.g., from paycheck to paycheck), or until the end of the current month, week, etc., or the user's money savings, checking account, etc. In another example, the user may use the interactive interface to calculate the affordability of an expense. For instance, the user may enter the amount needed for an expensive item along with an expected date of purchase, for example, the user may enter a dollar amount for an item to be purchased in three months, at Christmas, etc. The application may then determine whether the user will be able to afford the item within the certain time period specified (e.g., by Christmas).

The user may use the interactive interface of the user device to input or enter data, such as an amount and date, in different ways. One way may be to open the application downloaded on the user device, and simply enter a desired amount and date via a keyboard or other appropriate input interface. A second way may be to input a date and enter an amount via other techniques such as RFID, Near Field Communications (NFC), a camera, or by scanning a readable code such as a barcode, a QR code, etc., which may be attached or displayed on or in the vicinity of an item. A third way may be to use biometrics such as using a fingerprint, retina scan, voice, etc., which may be read or otherwise captured by a display placed on or in the vicinity of an item. In an example of this third way, a user may be shopping at a physical retail location and may walk up to an item of interest, for example an expensive electronic item, which may have a display having an input adapted to receive user biometric data (e.g. via a fingerprint) and determine, based on user data read and associated with appropriate user bank data, income, expenses, etc. how the expense (e.g. the price of the item) may impact the user's bank account or other resources or budget.

In an embodiment, an application may be provided by a remote server, for example a payment provider server such as PayPal®, Inc. or eBay®, Inc. of San Jose, Calif., USA. The remote server such as a server associated with PayPal® or eBay® of San Jose, Calif., USA, or any other appropriate entity, may store user information such as financial information including bank account balances, recurring expenses, recurring income or deposits, etc. to determine a projection or future resource forecasts.

Advantageously, the interactive interface of the user device may be considered as a "What If" or "Can I spend . . . " interaction that determines how certain potential expenses may affect the user's account balances or forecasts.

Referring to FIGS. 1, 2, 3, 3A, 3B, 4, 5A, 5A-1, 5B and 5B-1, a display of a user device is shown displaying various views for setting up an application for determining future resource forecasts according to one or more embodiments of the present disclosure.

Figure 1:
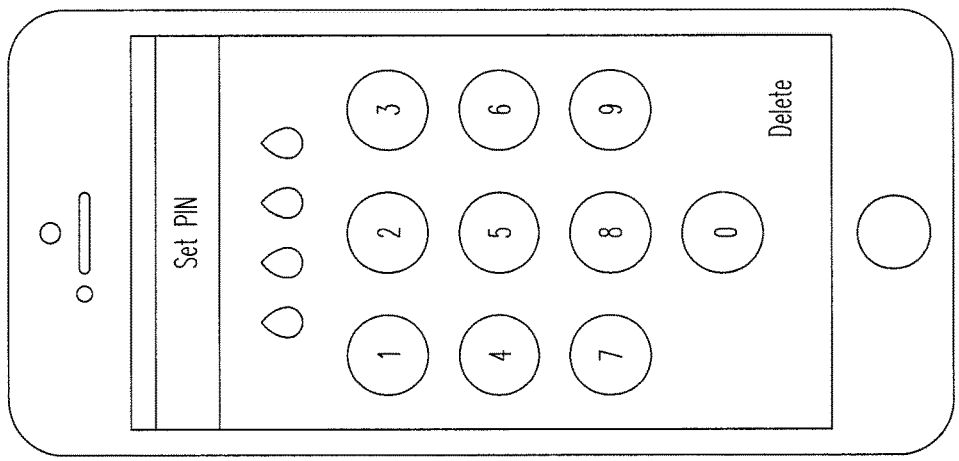
FIG. 1 shows a display of a user device illustrating a view for creating an account for setting up an application for determining future resource forecasts according to one or more embodiments of the present disclosure.

In the embodiment of FIG. 1, a user may download an application and sign up or create an account including setting up a user name in a user name field 101. Also, any other appropriate identifiers may be set up such as a phone number identifier 103. In an embodiment, a field labeled as "Phone" may launch a numeric keypad (not shown) to facilitate entry of phone number identifier 103. Signing up for the application may also include the user setting up authentication information or credentials such as a password, PIN, etc. as illustrated in the embodiment of FIG. 2.

Figure 3A:
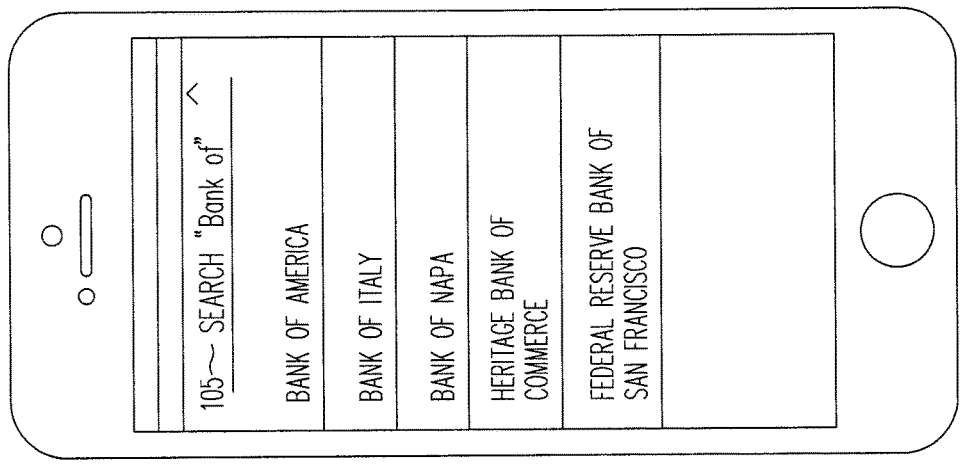
FIG. 3A shows a display of a user device illustrating a view for searching for one or more particular funding sources for an application for determining future resource forecasts according to one or more embodiments of the present disclosure.
Figure 3:
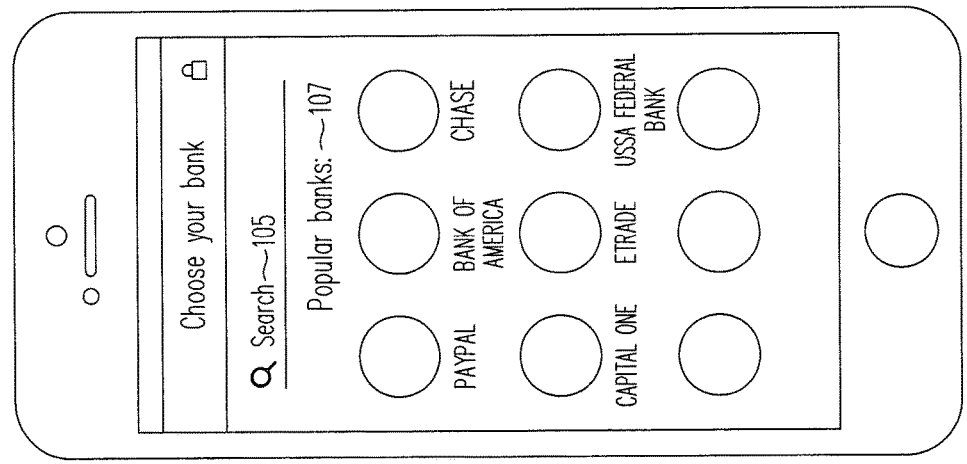
FIG. 3 shows a display of a user device illustrating a view for setting up one or more funding sources for an application for determining future resource forecasts according to one or more embodiments of the present disclosure.

Referring to FIG. 3, a user device displaying a view for setting up funding sources for the application for determining future resources forecasts is illustrated according to an embodiment of the present disclosure. In this embodiment, the application may present (e.g., via a list, a pop-up, a display on a separate window, a link, etc.) various popular financial sources 107 (e.g., PAYPAL, banks, etc.). In an embodiment where the various popular financial sources are listed, the list may scroll vertically to show further popular financial sources. The user may select (e.g., by tapping an icon, a button, or any other appropriate input interface) one or more financial sources in which the user has accounts. As such, in an embodiment, the application may display various popular financial sources 107 from which the user may choose such as PAYPAL, a particular bank such as BANK OF AMERICA, an investment account such as ETRADE, or any other appropriate financial source.

In another embodiment, the user may search (e.g., via interface 105) for one or more particular financial sources. For example, the user may "Search" for "PAYPAL" if the user is interested in using his or her PAYPAL account for the application. In one example, as illustrated in the embodiment of FIG. 3A, the user may search via interface 105 by entering one or more terms, e.g., "Bank of". As a result, the application may list various choices that include the searched-for terms. In this example, choices including the terms "Bank of" are presented including, "Bank of America", "Bank of Italy", "Bank of Napa", "Heritage Bank of Commerce", "Federal Reserve Bank of San Francisco", and any other appropriate funding sources matching the searched-for terms. As such, in various embodiments, the user may search for specific funding sources, or may choose from a presentation (e.g., a listing, etc.) of popular funding sources such as banks.

Figures 3B, 4:
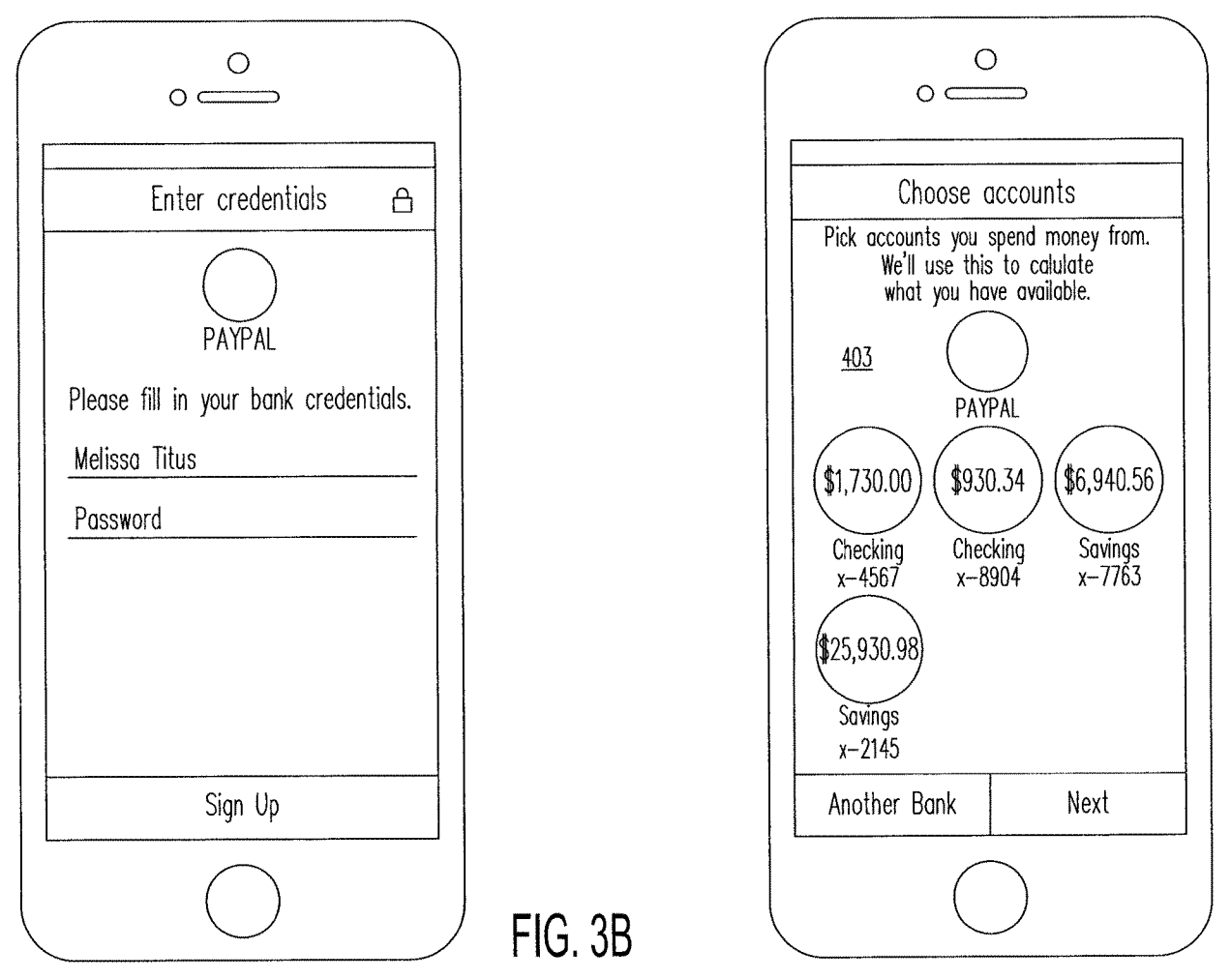

Referring to FIG. 3B, once the user has selected a funding source as described above with respect to the embodiments of FIGS. 3 and 3A, the user may enter his or her credentials or any authentication information associated with the selected financial source accounts. In the embodiment of FIG. 3B, the user may have selected a financial source such as "PAYPAL" for which the associated user credentials are requested such as the user's name, password, etc. Methods and systems according to embodiments of the present disclosure may then use the data from or associated with the financial sources (e.g., bank data) to accurately provide calculations or forecasts based on real, up-to-date information as will be described in more detail below according to one or more embodiments.

Referring to FIG. 4, once the user has entered his or her credentials or other authentication information associated with a particular financial source, the user may then choose one or more accounts associated with the particular financial source from which the user spends money. In the example embodiment of FIG. 4, the user may choose a checking account 403 having an account number "X-4567," which is associated with his or her selected PAYPAL financial source. It should be noted that the user may have one or more accounts with a particular financial source, for example, one or more checking accounts, one or more savings accounts, etc. associated with a bank, etc. The balance of the chosen account may then be determined, in this case, the chosen checking account 403 "X-4467" has a balance of $1730.00.

Referring to FIG. 5A, the user device may display a view of an application for entering expenses in order to carry out accurate calculations or forecasts. Categories of expenses may be added such as recurring expenses that may include rent/mortgage, utilities, etc. Details about the expenses may be entered such as the amount (e.g., "How much?"), frequency (e.g., "How often?"), starting day, date of next payment, etc. Expenses may continue to be added via an interface labeled "Next" and they may be saved via an interface labeled "Save." It should be noted that the exemplary interface labels illustrated in this disclosure for the various embodiments are for illustrative purposes only, and any other labels may be used as appropriate.

FIG. 5A-1 is a view of the application illustrating expenses that are entered and accounted for such as rent, utilities, phone bill, car payment, piano lesson, HULU, etc. along with their respective amounts, dates and frequency. One example includes a "Rent" expense of $1400 due monthly on the first. Another example includes "Utilities" expenses of $170 due monthly on the 12$^{th}$, and so on. In an embodiment where the user selects to "Skip expenses for now" (see FIG. 5A, reference numeral 515), the application may skip forward to a page wherein the user may input Income information.

Referring to FIG. 5B, the user device may display a view of the application for entering income information in order to carry out accurate calculations or forecasts. Categories of income may be added such as primary income (e.g., a paycheck), the amount (e.g., "How much?"), frequency (e.g., "How often?"), starting day, date of next income, etc. Income information may continue to be added via an interface labeled "Next".

FIG. 5B-1 illustrates Income sources entered and accounted for along with their respective amounts and frequency, including for example a My Paycheck of $1500.00 every other Friday, Jill's Paycheck of $900.00 Bi-monthly on the 12st and 15th, child support income of $2175.00 monthly on the 15th, etc.

Advantageously, methods and systems according to embodiments herein may use the user data or information, for example the user's financial source data, e.g., bank data, etc., expenses, income information, etc. to provide accurate calculations or forecasts based on real, up to date information.

Figure 6:
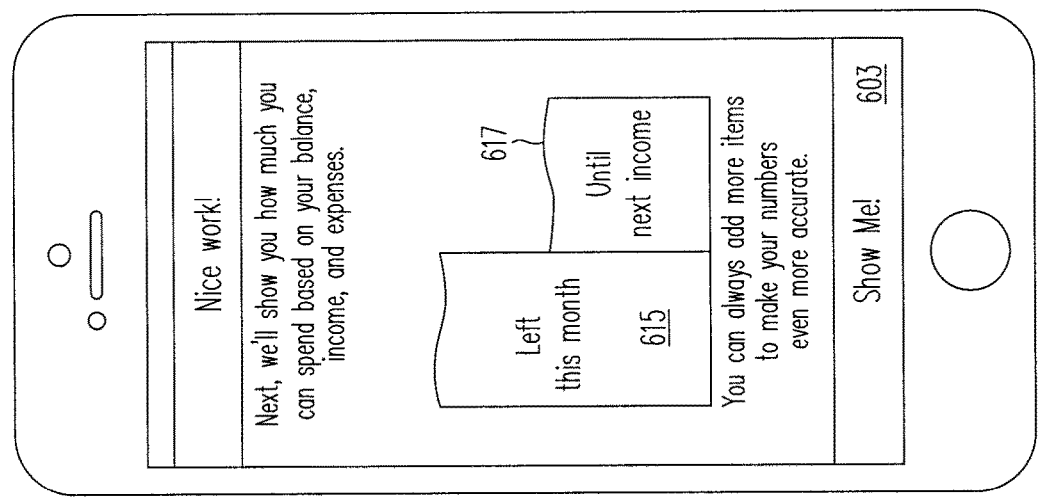
FIG. 6 shows a display of a user device illustrating a view of an application for determining future resource forecasts according to one or more embodiments of the present disclosure.

Referring to FIGS. 6-10, a user device displaying views of the application for determining future resource forecasts is illustrated according to one or more embodiments of the present disclosure. Once the application has been set up and the appropriate user information has been entered, for example, the financial sources, the accounts, the recurring expenses, income information, etc., the application may then determine projections or future resource forecasts. As illustrated in the embodiment of FIG. 6, the user may be shown how much the user can spend based on the user data such as the user's account balances in one or more funding sources, income, expenses, etc. The balance of available or spendable resources (e.g., money) may be an amount that is left or available for a specific period of time (e.g., left or available this month, week, etc.), or it may be an amount left or available until a next income such as until the next deposit, paycheck, etc. An interface 603 may be used to show the features of the application. Interface 603 may be labeled as "Show Me!", or it may be labeled with any other appropriate label. It should be noted that in various embodiments, the spendable or available resources (e.g., funds or money "Left this month," or "Until next income"), may be shown in the form of a level 615, 617 of a liquid in a container as will be more apparent in the illustrations described below according to one or more embodiments. As the available resource such as money goes down, so does the level of the "liquid" in the container. However, it should be noted that these illustrations using a liquid level are one example for displaying the aspects of the present disclosure, and are not meant to limit the scope of the disclosure.

Figure 7:
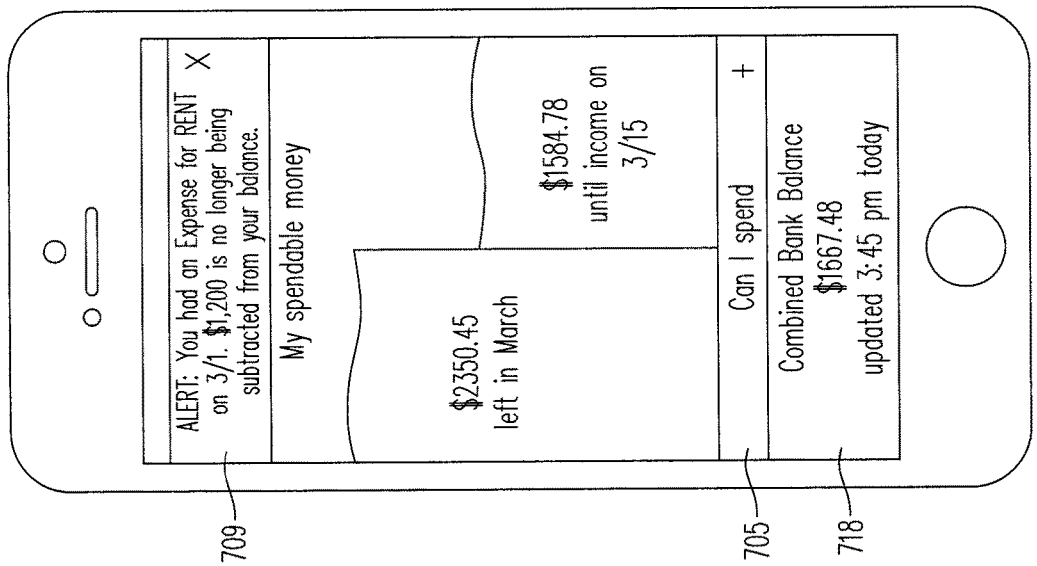
FIG. 7 shows a display of a user device illustrating available resources for an application for determining future resource forecasts according to one or more embodiments of the present disclosure.

Upon selecting interface 603, the application may display the available resources such as money or funds as illustrated in the example of FIG. 7. The spending numbers may be shown in various ways, for example, monthly or until next income, etc. In FIG. 7, the spendable money is illustrated to be $2350.45 left in March, and $1584.78 until income on March 15. The two spending numbers, $2350.45 and $1584.78, may be shown in their comparative liquid level as illustrated. A module or interactive user interface 705 may be labeled as "Can I spend . . . ," which may also be labeled as "What If", or have any other appropriate label. The user may select and enter information into module 705 to run scenarios like "What if I spend $100 on 3/5/2014?" In response, the spending numbers may change accordingly. For example, the amount left in March may change to "2250.45" (i.e., $2350.45 minus $100), and the amount until income on 3/15 may change to "1484.78" (i.e., $1584.78 minus $100).

In this embodiment, an Events field 718 may display events such as a latest bank account balance, which may be labeled as "Combined Bank Balance". The "Combined Bank Balance" may aggregate the various balances from one or more accounts associated with one or more funding sources of the user, for example, from each savings, checking, investment account, or the like, associated with each bank or other payment provider account of the user. In this example, the "Combined Bank Balance" is illustrated as $1667.48, which is up to date as of a recent time, for example 3:45 PM today. Other events may also be shown in this Events field 718 such as recent expense events that may be assumed to be cleared (e.g., rent for $1200 was cleared on 3/1, electricity bill for $25 was cleared on 3/2, etc.). In an embodiment, an Alert 709 may be displayed on a portion of the display of the user device. The Alert 709 may advice the user of an event when the user selects and enters an input on the "Can I spend . . . " interface 705, in addition to displaying the changed monthly and until next income numbers. Examples of other alerts may be: "Congratulations! You can spend the $100 as early as 06/02", or "Don't worry . . . even though you can't spend the $100 on 03/05, if you wait for 5 more days, you can spend it on 03/10". It should be understood that any appropriate labels, events, or alerts may be displayed according to various embodiments of the present disclosure.

It should be noted that there are various ways in which the user may use the interactive interface (i.e., interactive user interface 705) to input or enter an expense amount, date, or other appropriate information. For example, the following three different ways may be appropriate: 1) the user may enter an amount and a date on a page of the application downloaded on the user device, e.g., via a keyboard, keypad, touchscreen, etc.; 2) the user may read or scan a readable code that may be located on or in the vicinity of an item, for example, a barcode, a QR code, etc.; or 3) biometric data (e.g., via voice, a fingerprint, retina scan, etc.) may be used by a user touching, contacting, or inputting information on a display located on, or next to, or for a desired item. In an instance, a user shopping in a retail store may walk up to a service or product ("item") such as an electronic device or other item having an interactive interface such as a biometric data reader, e.g., a fingerprint reader, via which user information may be determined for calculating future resource forecasts based on the user information including the user's bank data, income, expenses, etc. As such, embodiments herein may then determine whether the price of the item is affordable based on the read user data such as bank data, income, expenses, etc.

Figure 8:
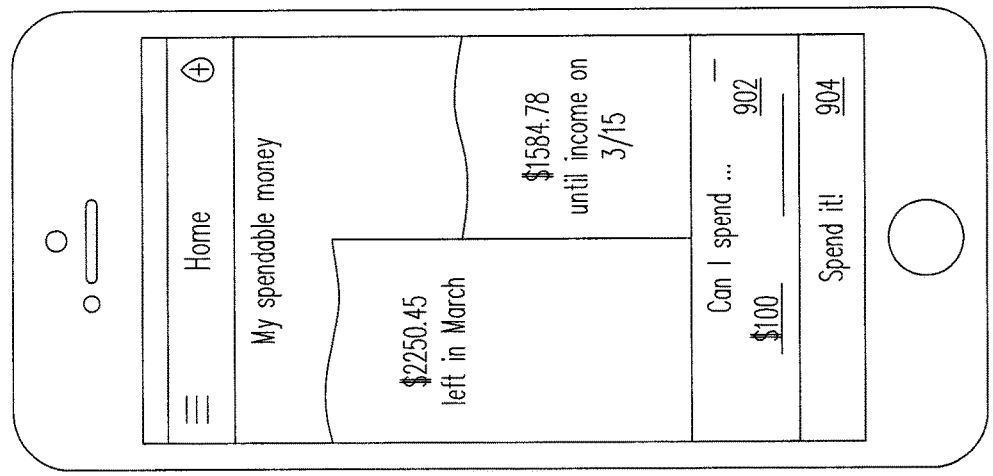
FIG. 8 shows a display of a user device illustrating an example of an impact of a selected amount for an application for determining future resource forecasts according to one or more embodiments of the present disclosure.

Referring to FIG. 8, a display of a user device illustrates an example of the application showing an impact of a selected amount on a calculated budget or forecast according to an embodiment. In the embodiment of FIG. 8, an interactive user interface 902, which may be labeled as "Can I spend . . . " (or have any other appropriate label), may be adapted to receive user inputs including an amount for an expense the user wishes to make. The user may select a dollar value and a date when the user would like to spend the selected dollar value. In this example, the user inputs an amount of $100 to determine its impact on a calculated budget or forecast. As a result, the spendable money levels change. Also, other numbers may change including the combined bank balances. That is, in this example, the interactive user interface 902 may be used to run a scenario for calculating the impact of an amount that the user desires to spend such as "Can I spend $100?" In response, the spending numbers change accordingly. The changes in spendable money numbers may change also according to the date when the expense would take place. In this example, if the user selects a date after 03/15 and before 03/31, the balance or amount left in the month ("left in March"), would change to take into account the expense amount, but the balance or amount left until 03/15 would not change because the date is after 03/15 (and before 03/31). As such, the date may dictate which spending number changes.

In this particular example, the spending numbers are illustrated to change to $2250.45 (from $2350.45 as illustrated in the embodiment of FIG. 7) left in March, and $1584.78 until income on March 15 (this spending number "until income on 3/15" does not change assuming that the expense of $100 will be later than 03/15). In an embodiment, as the user enters information via interactive interface 902, the liquid levels may correspondingly change. The two spending numbers, $2350.45 and $1584.78, may be shown in their comparative liquid levels as illustrated. In this case, the user may consider or evaluate the spendable resource levels and decide whether the user wants to spend the desired amount. The user may decide to spend the amount and use an interface 904 labeled "Spend it". As such, the user may use the interactive user interface 902 to see how it affects his or her budget based on the spendable money determined from data such as bank data, expenses, income, deposits, etc. That is, the user may find out the impact or effects if he or she spends the $100 (e.g., on a date after March 15)—would this expense amount be within the user's budget? In this case, the amount is determined to be within the user's budget, and the user may decide to spend the amount and use an interface 904, which in this case is labeled "Spend it!" (or have any other appropriate label).

Figure 9:
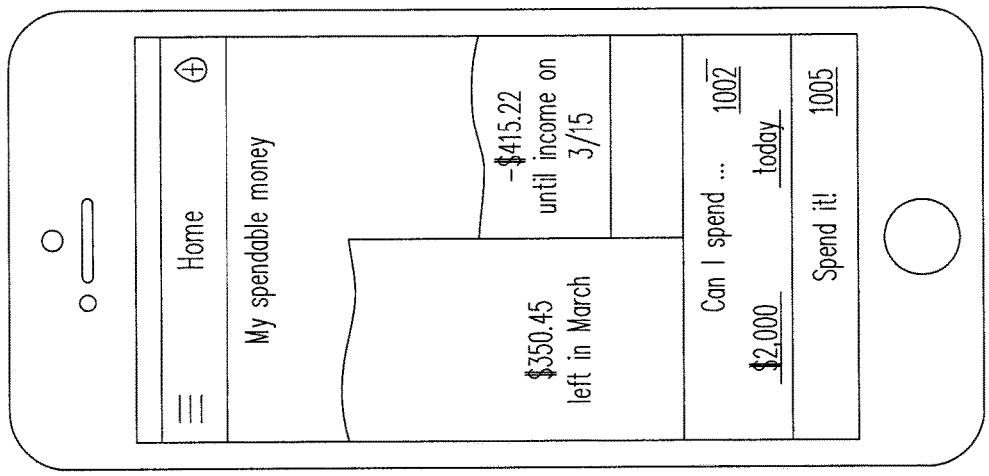
FIG. 9 shows a display of a user device illustrating another example of an impact of a selected amount for an application for determining future resource forecasts according to one or more embodiments of the present disclosure.

Referring to FIG. 9, a display of a user device illustrates another example of the application showing an impact of a selected amount on a calculated budget or forecast according to an embodiment. In the embodiment of FIG. 9, an interactive user interface 1002 is illustrated wherein a user may input an amount for an expense the user wishes to make, in this case $2000, and when the user wishes to make the expense, in this case "today." Here, assuming that the amount left in March was $2350.45 (for example as illustrated in the embodiment of FIG. 7), and the amount until income on 3/15 was $1584.78, the updated amount "left in March" (upon the user inputting an amount of $2000 and a date of "today" on interactive user interface 1002) is shown to be $350.45 (i.e., $2350.45 minus $2000). The updated amount "until income on 3/15" is shown as −$415.22 ($1584.78 minus $2000). Embodiments herein provide views of the application wherein an image is a representation of how the update would reflect, that is, how a desired amount and date would affect the spendable money numbers. An interface 1005 having a label "Spend It" (or any other appropriate label), may be chosen by a user even though the future cash balance is negative. That is, interface 1005 labeled as "Spend It" assumes that the user will spend the amount on a set date and reflects the new spendable numbers (in this case, a negative value).

Referring to FIG. 10, a display of a user device illustrates another example of a view of an application according to an embodiment. In the embodiment of FIG. 10, a Combined Balances field is displayed showing an amount of $1650.00, and an amount of $350.45, which is available until next income on April 14. This example also shows Events 1032 displayed on a portion of the user device, which includes "Recently Cleared" transactions, for example, Rent was cleared on March 18, cable was cleared on March 17, Income of $1200.00 was posted on March 14, etc.

In various embodiments, the recently cleared transactions may not factor into the spendable number displayed. As such, these transactions are assumed to be cleared and so are no longer withheld from the spendable numbers based on the expense date inputted by the user. In an embodiment where the assumption is incorrect, the user may tap to summon the expense details screen and assign a new due date, for example, by selecting an interface labeled as, for example "Fix this?".

The amount for "Until next income" may be calculated as follows:

Until Next Income Amount=Current bank balance−Future expenses before the user gets the next income.

Hence, in the example of FIG. 10, the amount "until next income on 4/14" is calculated to be $350.45=$1650−$1299.55 in expenses (expenses not shown).

The amount for "Until End of Month" may be calculated as follows:

"Until End of Month" Amount=Current bank balance+future incomes before the end of the month−future expenses before the end of the month.

Figure 13:
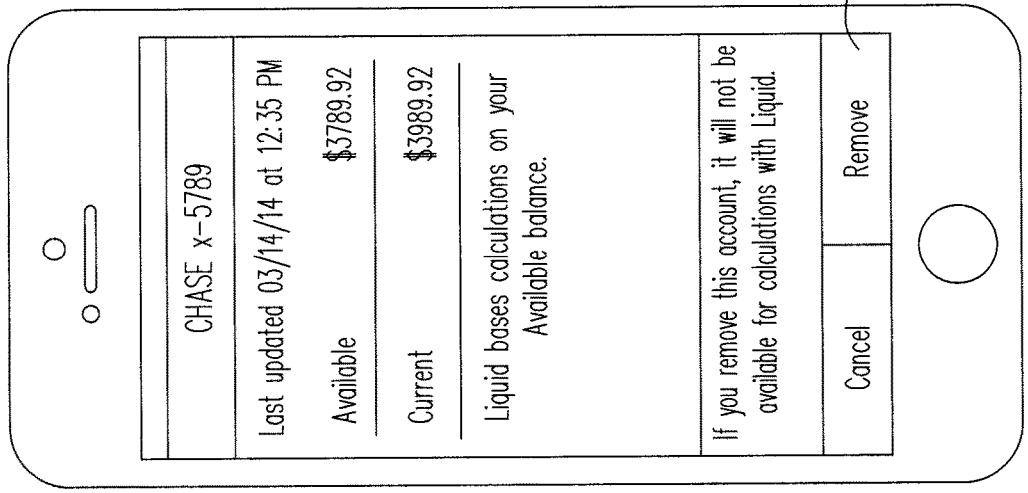
FIG. 13 shows a display of a user device illustrating a view of an application with an option for removing a funding source or an account according to one or more embodiments of the present disclosure.
Figure 12:
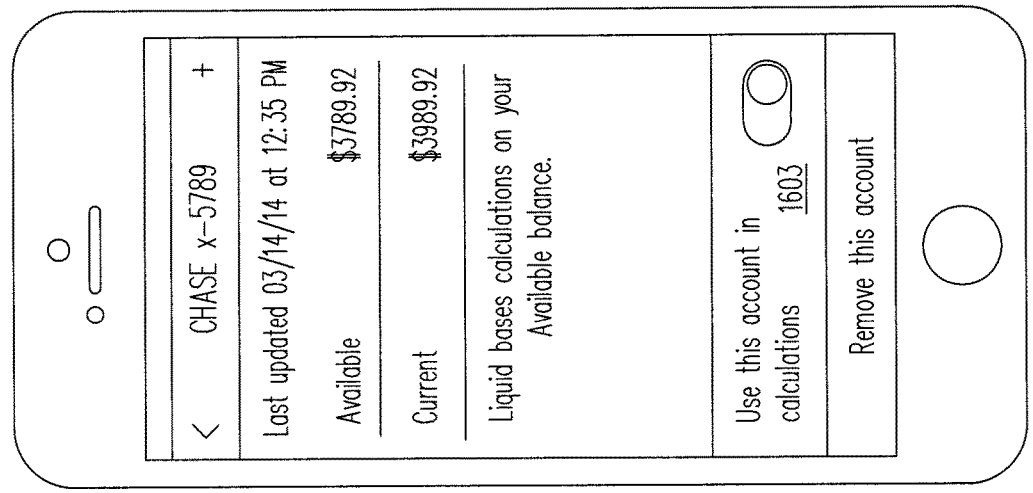
FIG. 12 shows a display of a user device illustrating a view of an application showing an account of a funding source and its available balance according to one or more embodiments of the present disclosure.

Referring to FIGS. 11-13, a display of a user device illustrates various views of an application showing account details associated with various funding sources according to one or more embodiments of the present disclosure. The embodiment of FIG. 11 illustrates a funding source such as PAYPAL that may include a checking account x-5789 having a balance of $3789.92, a checking account x-0978 having a balance of $1256.04, a savings account x-2777 having a balance of $600.19. Another funding source is illustrated as being WELLS FARGO, which includes a checking account x5789 having a balance of 912.88, a checking account x-0978 having a balance that may not be displayed because there may be an error linking to that particular bank, and a savings account x2777 having a balance of $119.78.

FIG. 12 illustrates an account of a funding source and its available balance. For example, a CHASE account number x-5789 has an available balance of $3789.92 that was recently updated on Mar. 14, 2014 at 12:35 PM, and a Current balance of $3989.92. It should be noted that the Available balance=Current balance−Pending balance. That is, even though the user's bank Current balance is $3989.92, it does not mean that the user can withdraw the entire $3989.92 or spend that amount because there may be a pending balance that may not have cleared yet. The available balance is the current balance of $3989.92 minus any pending balances. Methods and systems according to embodiments herein may base calculations on available balances as illustrated in this example. An interface 1603 may present an option such that this particular account may be selected (or not selected) for use in calculations.

Embodiments herein use an available bank balance in calculating forecasts. That is, a projected forecast or spendable amount may be calculated in a simple manner as follows: Available balance−Future Expenses+Future Income=Spendable amount in a certain period of time, or until the next income, etc. The impact to a user's budget is thus easily determined.

In one embodiment, the impact of an expense may be calculated on a paycheck to paycheck basis. In another embodiment, the impact of an expense may be calculated in a particular timeframe (e.g., "Can I spend $X.00 in a time frame of X months?"); in this way, the affordability of an item may be provided, for example, "Can I spend $700 in 3 months?" or "Can I afford to buy a $10,000 car by Christmas?"). Embodiments herein may determine affordability based on account balances, future income, expenses, etc.

FIG. 13 illustrates an option for removing a funding source or an account. In this case, the user may wish to remove CHASE account x5789 by selecting an interface 1702 labeled "Remove."

Figure 14:
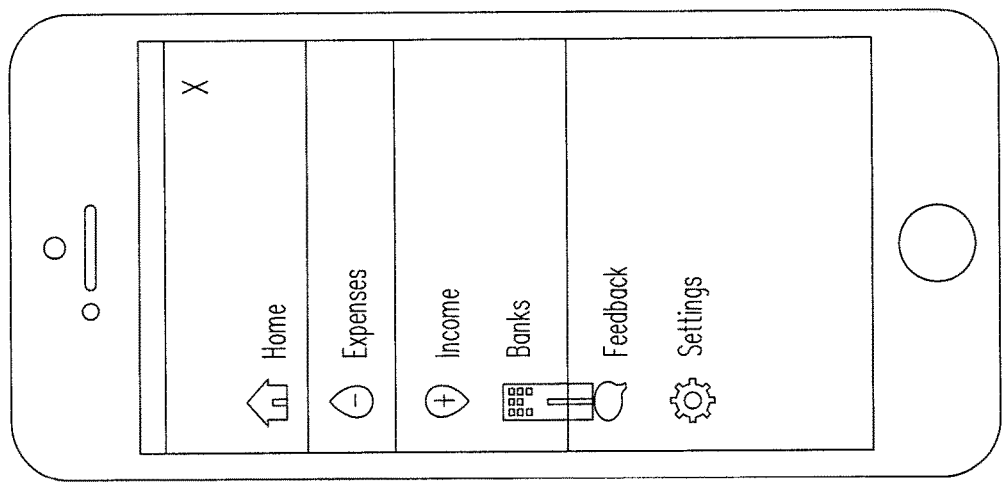
FIG. 14 shows a display of a user device illustrating a view of a navigation page for an application for determining future resource forecasts according to an embodiment of the present disclosure.

Referring to FIG. 14, a display of a user device illustrates a view of a navigation page for an application for determining future resource forecasts according to an embodiment of the present disclosure. The navigation page may include a menu that may provide user-selectable interfaces linking to the various functions of the application. For example, the interfaces may link to application pages or views such as a Home page, an Expenses page, an Income page, a Banks page, a Feedback page, a Settings page and/or any other appropriate pages or views. The Home page may link to a page as illustrated, for example, in the embodiments of FIG. 7, 8, 9 or 10 showing the spendable money available and an option to determine "what if" a certain desired amount is spent, which may be selected via an interface labeled, for example as "Can I spend . . . " and entering the desired amount and date of the expense. The Expenses link may link to a page as illustrated, for example, in the embodiment of FIG. 5-A1 presenting the entered and accounted expenses. The Income page may link to a page as illustrated, for example, in the embodiment of FIG. 5-B1 presenting the entered Income sources. The Banks page may link to a page as illustrated, for example, in the embodiment of FIG. 11. The Feedback page may link or launch to an application page or view (not shown) such as an email page wherein a user may input a message giving feedback about the application, for example, positive feedback about the application being user-friendly and very functional. The Settings page (not shown) may link to an application page or view giving an option to update user information such as an identifier such as a phone number, a name, changing a PIN, resetting the application thus removing all personal and financial information, etc.

Figure 15:
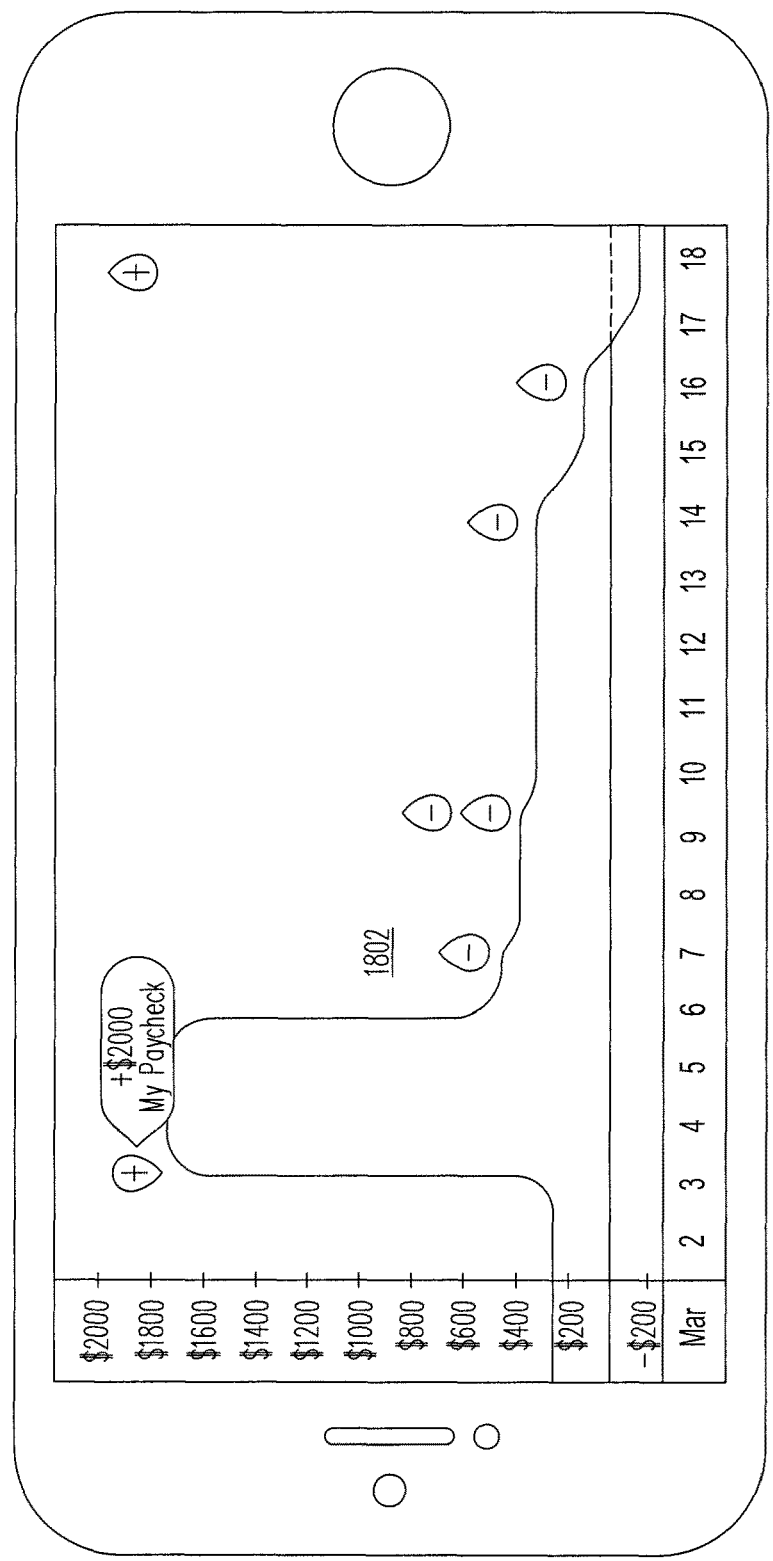
FIG. 15 shows a display of a user device illustrating an application showing a landscape view for a future resource forecast according to one or more embodiments of the present disclosure.
Figure 16:
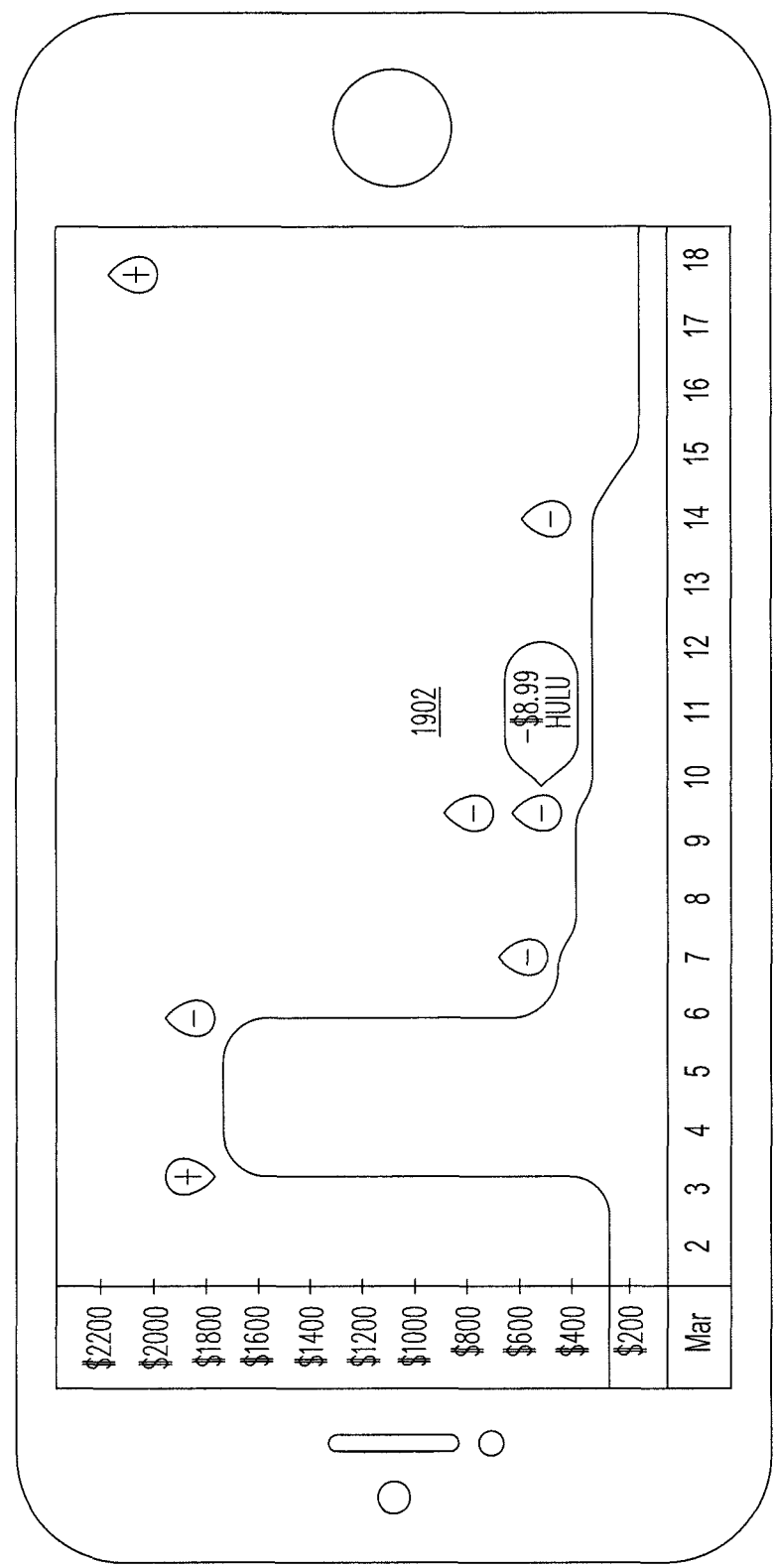
FIG. 16 shows a display of a user device illustrating an application showing another landscape view for a future resource forecast according to one or more embodiments of the present disclosure.

Referring to FIGS. 15-16, a display of a user device illustrates an application showing landscape views for a future resource forecast according to one or more embodiments of the present disclosure. In the embodiment of FIG. 15, a future resource forecast includes an available balance or spendable money that is illustrated graphically over a period of time. The Y-axis may represent the user's overall available balance, that is, the sum of available balances from his or her financial sources. As such, the graph illustrates how the overall balance rises/falls with income and expenses. The X-axis may represent dates, which may be 15 days ahead or any other appropriate number of days. The user may swipe along the dates, for example, left to right, or wave to move along dates, which results in the graph changing accordingly. The user may also pinch the graph or perform any other appropriate interactive gesture to zoom in or zoom out and show shorter or longer timeframes. In this example, a forecast or balance may increase when a paycheck of $2000 is deposited around March 3. Subsequently, the balance may proportionally decrease as expenses such as expense 1802 are made at different times, for example, expenses made around March 7, March 9, March 14, March 16, etc. Advantageously, the landscape view may provide visibility on day to day resource flows. In an embodiment, the landscape view may appear or be accessed when the user device is tilted horizontally.

As illustrated in the embodiment of FIG. 16, details about the expenses may be viewed, for example, by expanding an icon 1902, which shows the expense as corresponding to a HULU payment of $8.99. It should be noted that although a liquid graphic is used to illustrate embodiments of the present disclosure, they are for illustration purposes only and not for limiting the scope of the disclosure.

Embodiments herein thus provide an interactive way to determine how an amount or expense may impact an account balance. A future resource forecast is provided. Such content is provided to the user through unique graphical user interfaces to enable more efficient and easier data entry, processing, and viewing.

Referring now to FIG. 17, a block diagram of a networked system suitable for implementing one or more processes described herein is illustrated according to an embodiment of the present disclosure. In the embodiment of FIG. 17, a system 2100 according to one or more embodiments may include at least one user device 2104 (e.g., network computing device) associated with a user 2102 (e.g., owned or used), and at least one remote server or device 2106 (e.g., network server device) in communication over a network 2108.

Network 2108, in one embodiment, may be implemented as a single network or a combination of multiple networks. For example, in various embodiments, network 2108 may include the Internet and/or one or more intranets, landline networks, wireless networks, and/or other appropriate types of communication networks. In another example, network 2108 may comprise a wireless telecommunications network (e.g., cellular phone network) adapted to communicate with other communication networks, such as the Internet. As such, in various embodiments, user device 2104 and remote server or device 2106 may be associated with a particular link (e.g., a link, such as a URL (Uniform Resource Locator) to an IP (Internet Protocol) address).

User device 2104, in various embodiments, may be implemented using any appropriate combination of hardware and/or software configured for wired and/or wireless communication over the network. In various examples, user device 2104 may be implemented as a mobile device such as a wireless telephone, a cellular or mobile smart phone, a tablet, a personal computer, a notebook computer, a wearable computing device, and/or various other generally known types of wired and/or wireless computing devices.

User device 2104, in one embodiment, includes a user interface application 2112, which may be utilized by a user to conduct transactions (e.g., shopping, purchasing, bidding, etc.) with the remote server or device 2106 over the network 2108. In one aspect, purchase expenses may be directly and/or automatically debited from an account related to the user 2102 via the user interface application 2112.

In one implementation, the user interface application comprises a software program, such as a graphical user interface (GUI), executable by a processor that is configured to interface and communicate with the remote location server 2106 via the network 2108. In another implementation, the user interface application 2112 comprises a browser module that provides a network interface to browse information available over the network 2108. For example, the user interface application 2112 may be implemented, in part, as a web browser to view information available over the network 2108. Accordingly, in one or more embodiments, the user 2102 may conduct transactions (e.g., purchase and provide payment for one or more items) from one or more entity servers (not shown) via the remote location server 2106.

The user device 2104, in various embodiments, may include other applications 2114 as may be desired in one or more embodiments of the present disclosure to provide additional features available to user 2102. In one example, such other applications may include security applications for implementing client-side security features, programmatic client applications for interfacing with appropriate application programming interfaces (APIs) over the network 2108, and/or various other types of generally known programs and/or software applications. In still other examples, the other applications 2114 may interface with the user interface application 2112 for improved efficiency and convenience.

According to one or more embodiments, the user interface application 2112 or the other applications 2114 may include an application that may be downloaded and installed on user device 2104 from remote server or device 2106, or from any other appropriate entity. The application enables user device 2104 to calculate future resource forecasts based on user data such as funding source data, income data, expenses, etc. In one or more embodiments, the user 2102 may complete a transaction such as making payments to an appropriate entity via the remote server or device 2106, wherein the remote server or device may be, for example, a payment service provider, a financial institution, or any other appropriate transaction processing entity.

The user device 2104, in one embodiment, may include at least one user identifier, which may be implemented, for example, as operating system registry entries, cookies associated with the user interface application 2112, identifiers associated with hardware of the user device 2104, or various other appropriate identifiers. The user identifier may include one or more attributes related to the user 2102, such as personal information related to the user (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, the user identifier may be passed with a user login request to the remote server or device 2106 via the network 2108, and the user identifier may be used by the remote server or device 2106 to associate the user 2102 with a particular user account maintained by the remote server or device 2106.

The remote server or device 2106, in one embodiment, may be maintained by a transaction processing entity, which may provide processing for financial transactions and/or information transactions. As such, the remote server or device 2106 includes a service application 2116, which may be adapted to interact with user device 2104 over the network 2108 to facilitate the searching, selection, purchase, and/or payment of items by the user 2102 from one or more entity servers. In one example, the remote server or device 2106 may be provided by PayPal®, Inc., eBay®, Inc. of San Jose, Calif., USA, and/or one or more financial institutions or a respective intermediary that may provide multiple point of sale devices at various locations to facilitate transaction routings between entities and, for example, financial institutions.

The service application 2116, in one embodiment, utilizes a payment processing module to process purchases and/or payments for financial transactions between the user 2102 and one or more entity servers. In one implementation, the payment processing module assists with resolving financial transactions through validation, delivery, and settlement. As such, the service application 2116 in conjunction with the payment processing module settles indebtedness between the user 2102 and one or more entities, wherein accounts may be directly and/or automatically debited and/or credited of monetary funds in a manner as accepted by the banking industry.

The remote server or device 2106, in one embodiment, may be configured to maintain one or more user accounts 2118 and entity accounts in an account database 2122, each of which may include account information associated with one or more individual users such as user 2102. For example, account information may include private financial information of each user, such as one or more account numbers, passwords, credit card information, banking information, or other types of financial information, which may be used to facilitate financial transactions between the user and one or more entities. In various aspects, the methods and systems described herein may be modified to accommodate users that may or may not be associated with at least one existing user account.

In one implementation, the user 2102 may have identity attributes stored with the remote server or device 2106, and the user 2102 may have credentials to authenticate or verify identity with the remote server or device 2106. User attributes may include personal information that may include biometric information of the user such as fingerprint information, retina scan information, etc., banking information and/or funding sources as previously described. In various aspects, the user attributes may be passed to the remote server or device 2106 as part of a login, search, input, selection, purchase, and/or payment request, and the user attributes may be utilized by the remote server or device 2106 to associate the user 2102 with one or more particular user accounts 2118 maintained by the remote server or device 2106.

Figure 18:
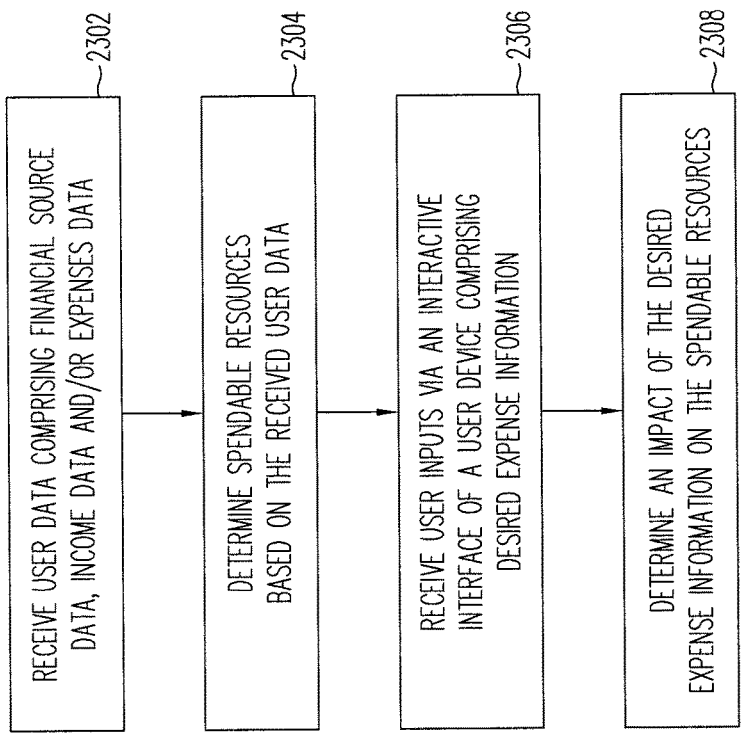
FIG. 18 is a flow diagram illustrating a method for determining future resource forecasts according to an embodiment of the present disclosure.

Referring now to FIG. 18, a flow diagram illustrates a method for determining future resource forecasts according to an embodiment of the present disclosure. It should be noted that the method illustrated in the embodiment of FIG. 18 may be implemented by the system of FIG. 17 according to one or more embodiments.

As described above according to one or more embodiments, a user may download, install and run an application (App), which may be obtained from a remote server or device such as a payment provider server, on a user device. The application may be used for determining future resource forecasts. For example, the application may be used for determining an impact or effect of potential expenses on spendable or available resources.

In block 2302, user data may be received comprising financial source data, income data and/or expenses data. In various embodiments, a user may set up the application on the user device by entering user data or information that includes information about funding sources where the user has accounts with associated balances. The user may choose which account or accounts may be used in setting up the application, for example, the user may use a checking account and a savings account, but not an investment account, associated with a particular bank. The user data or information may also include income and associated dates and frequency, for example, paychecks, bonuses, etc. on a specific date and/or on a weekly, monthly, biannually, etc. basis. The user data or information may further include expenses data and associated dates and frequency, for example, recurring expenses such as rent on a monthly basis on the $15^{th}$ of each month, car payments, utility bills, and the like.

In block 2304, spendable or available resources may be determined based on the user data or information. For example, spendable or available resources may be determined based on the user data, which may include future expenses (e.g., an upcoming bill) and future income (e.g., an upcoming paycheck) within a certain period of time. In various embodiments, spendable resources comprise an amount left until a next income and/or an amount left in a current time period.

In block 2306, user inputs may be received via an interactive user interface of a user device comprising desired expense information. For example, a user may desire to spend a certain amount on a large purchase or a trip on or by a certain date. The user may enter such expense information that includes the amount the user wishes to spend and the date on or by which the user wishes to spend the amount. In an embodiment, the user device may include an interactive user interface displayed on a portion of the user device, which may prompt the user to enter a dollar amount and an associated date on which the dollar amount would be spent.

In block 2308, an impact or effect of the desired expense information on the spendable or available resources is interactively determined. For example, based on the date and amount that the user desires to spend, the system calculates if the user can afford to spend such amount based on currently available funding source balances minus future expenses plus future income in a certain period of time. The system may then display an updated spendable amount reflecting how the desired expenditure affects the available resources within a period of time. In an embodiment, the system sets forth the affordability of a desired expenditure, for example, the impact on the updated amount may show that the user cannot afford the desired expense, or may have to wait for a longer period of time before the user can afford the desired expense.

Figure 19:
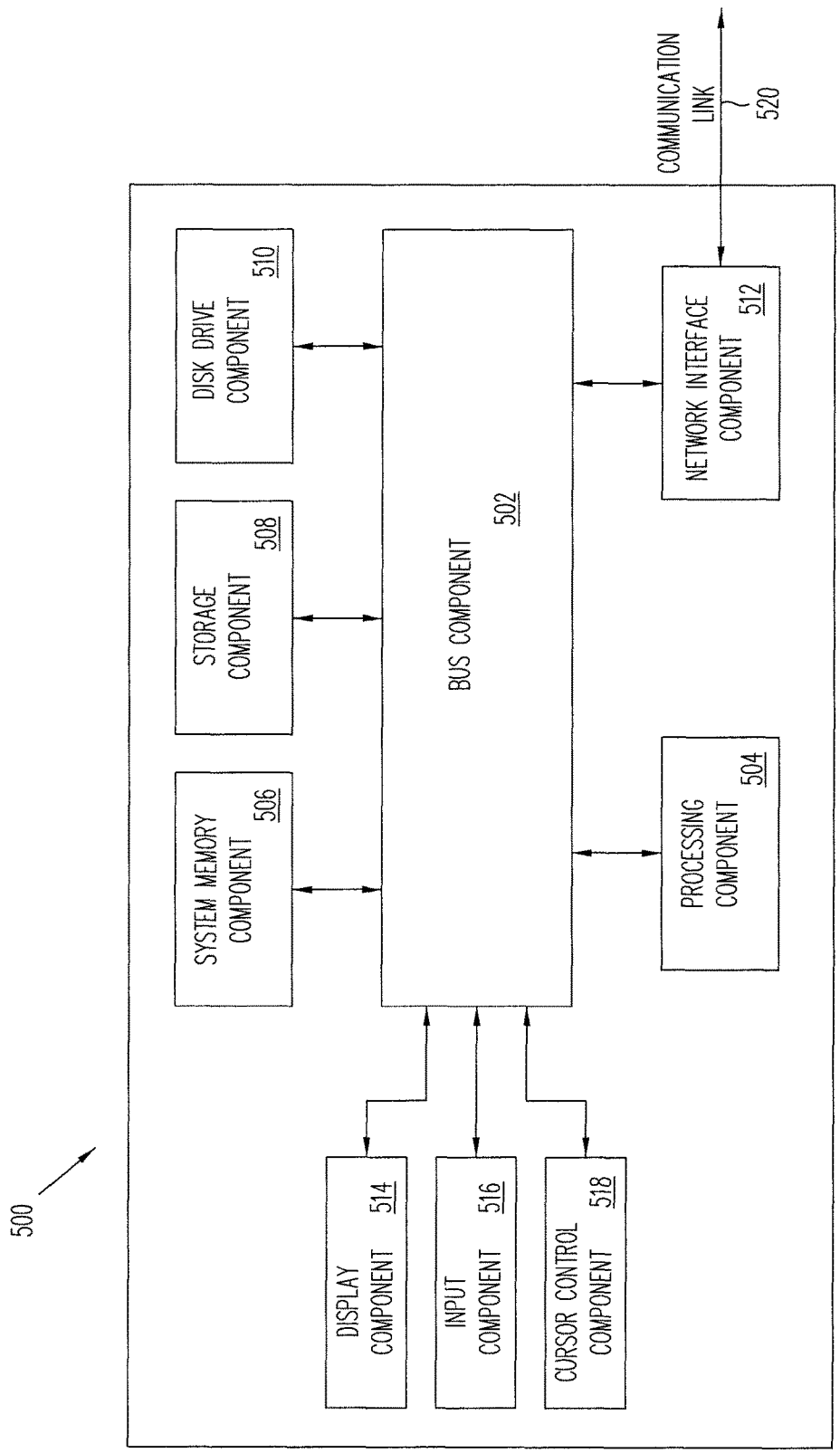
FIG. 19 shows a block diagram of a system suitable for implementing one or more embodiments of the present disclosure.

Referring now to FIG. 19, a block diagram of a system 500 is illustrated suitable for implementing embodiments of the present disclosure, including a user device, and a remote server or device. System 500, such as part of a cell phone, a smart phone, a tablet, a personal computer and/or a network server, includes a bus 502 or other communication mechanism for communicating information, which interconnects subsystems and components, including one or more of a processing component 504 (e.g., processor, micro-controller, digital signal processor (DSP), etc.), a system memory component 506 (e.g., RAM), a static storage component 508 (e.g., ROM), a network interface component 512, a display component 514 (or alternatively, an interface to an external display), an input component 516 (e.g., keypad, keyboard, touchpad, voice input, audio input, biometric input, RFID, NFC, scanner, reader, etc.), and a cursor control component 518 (e.g., a mouse pad).

In accordance with embodiments of the present disclosure, system 500 performs specific operations by processor 504 executing one or more sequences of one or more instructions contained in system memory component 506. Such instructions may be read into system memory component 506 from another computer readable medium, such as static storage component 508. These may include instructions to calculate and present future money forecasts. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, volatile media includes dynamic memory, such as system memory component 506, and transmission media includes coaxial cables, copper wire, and fiber optics, including wires that comprise bus 502. Memory may be used to store visual representations of different options for searching, auto-synchronizing, making payments or conducting financial transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 (e.g., a network, LAN, WLAN, PTSN, or various other wired or wireless networks) may perform instruction sequences to practice the disclosure in coordination with one another. Computer system 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution.

In view of the present disclosure, it will be appreciated that various methods and systems have been described according to one or more embodiments for determining future resource forecasts.

Although various components and steps have been described herein as being associated with a user device and a remote server or device, it is contemplated that the various aspects of such servers may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figures 20, 21:
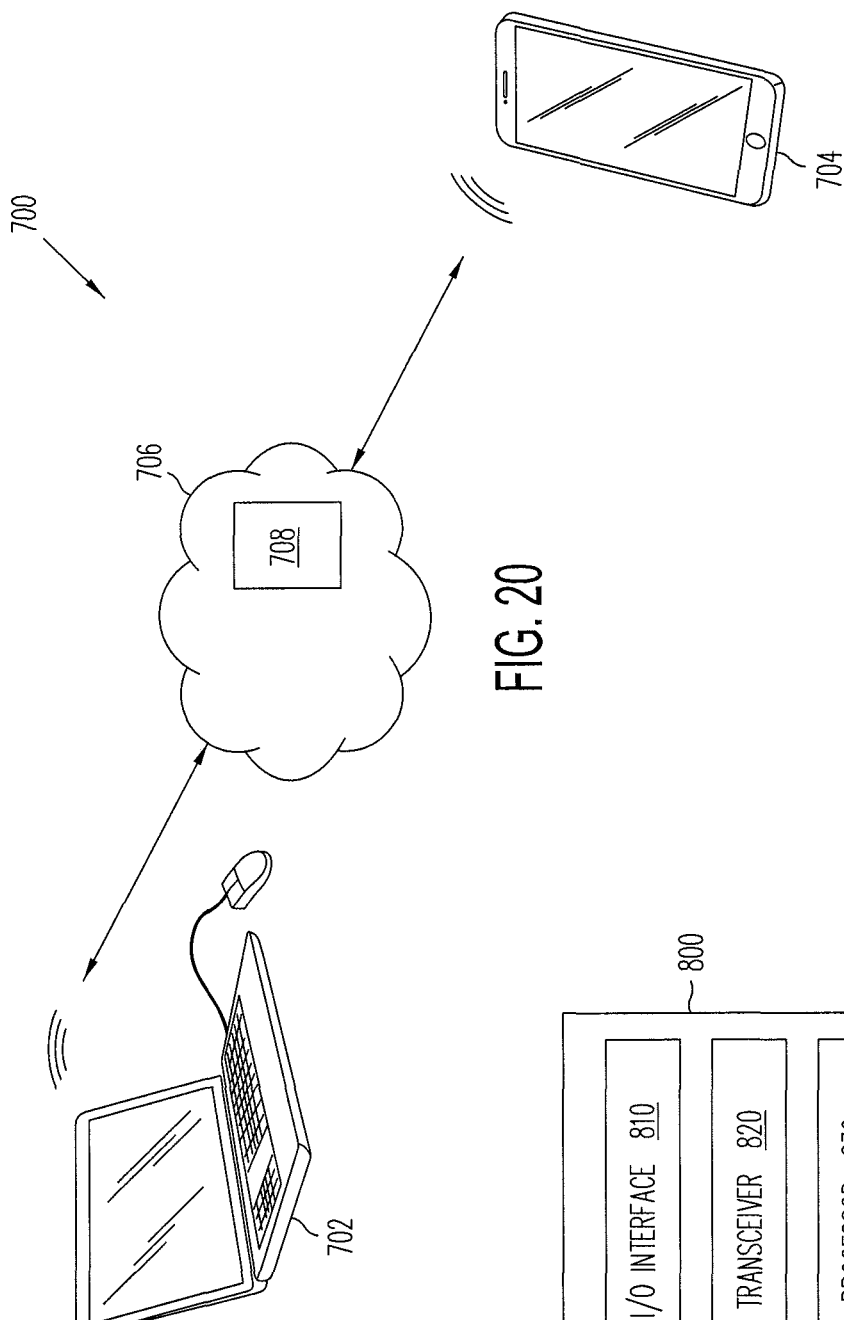
FIG. 20 illustrates an example of a cloud-based computing architecture, which may be used to implement various aspects of the present disclosure.
FIG. 21 is a simplified block diagram of an electronic system for facilitating electronic commerce.

FIG. 20 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet).

The mobile device 704 is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an application on mobile device 704 may perform basic input/output interactions with the user, but a majority of the processing and caching may be performed by the cloud-based resources 708. However, other divisions of responsibility are also possible in various embodiments.

The cloud-based computing architecture 700 also includes the personal computer 702 in communication with the cloud-based resources 708. In one example, a participating entity/merchant or consumer/user may access information from the cloud-based resources 708 by logging on to a merchant account or a user account at computer 702.

It is understood that the various components of cloud-based computing architecture 700 are shown as examples only. For instance, a given user may access the cloud-based resources 708 by a number of devices, not all of the devices being mobile devices. Similarly, an entity/merchant or another user may access resources 708 from any number of suitable mobile or non-mobile devices. Furthermore, the cloud-based resources 708 may accommodate many users in various embodiments.

FIG. 21 is a simplified block diagram of an electronic system 800 for facilitating electronic commerce. For example, the electronic system 800 may be used by a third party payment provider to carry out the steps for determining future resource forecasts based on, user data or information as discussed herein.

The electronic system 800 includes an input/output interface module 810. The interface module 810 is operable to receive an input from an external entity and communicate an output to the external entity. The external entity may include an entity/merchant or a user/consumer. In an embodiment, the input/output interface module 810 includes a visual display unit. The input/output interface module 810 may also include physical and/or virtual buttons, keyboards, mouse, track balls, speakers, microphones, light-sensors, light-emitting diodes (LEDs), communications ports (such as USB or HDMI ports), joy-sticks, image-capture devices (for example cameras), etc.

The electronic system 800 includes a transceiver module 820. The transceiver module 820 contains various electronic circuitry components configured to conduct telecommunications with one or more external devices. The electronic circuitry components allow the transceiver module 820 to conduct telecommunications in one or more of the wired or wireless telecommunications protocols, including communications protocols such as IEEE 802.11 (WiFi), IEEE 802.15 (Bluetooth), GSM, CDMA, LTE, WIMAX, DLNA, HDMI, etc. In some embodiments, the transceiver module 820 includes antennas, filters, low-noise amplifiers, digital-to-analog (DAC) converters, analog-to-digital (ADC) converters, and transceivers. The transceiver module 820 may further include circuitry components such as mixers, amplifiers, oscillators, phase-locked loops (PLLs), and/or filters. Some of these electronic circuitry components may be integrated into a single discrete device or an integrated circuit (IC) chip.

The electronic system 800 also includes a computer processor module 830 that is operable to execute computer instructions. The computer processor module 830 may contain one or more central processing units (CPUs), graphics processing units (GPUs), or digital signal processors (DSPs), which may each be implemented using various digital circuit blocks (including logic gates such as AND, OR, NAND, NOR, XOR gates, etc) along with certain software code.

The electronic system 800 includes a memory storage module 840. The memory storage module 840 may contain various forms of digital memory, such as hard disks, FLASH, SRAM, DRAM, ROM, EPROM, memory chips or cartridges, etc. Computer programming code may be permanently or temporarily stored in the memory storage module 840, for example. The processor module 830 may be used to execute the computer programming code stored in the memory storage module 840.

The memory storage module 840 also contains a program module that is configured to facilitate transactions according to the present disclosure. For example, the program module operates to provide actions to customize images based on location, user profile and/or other appropriate data.

In some embodiments, the electronic system 800 may also be implemented on a portable electronic device such as a mobile telephone or a computer tablet.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure. For example, although entity or merchant transactions have been described according to one or more embodiments, it should be understood that the present disclosure may also apply to transactions where requests for information, requests for access, or requests to perform certain other transactions may be involved. Also, it should be understood that the present disclosure may apply to any resources that may be of value including for example, currency or money, notes, points, rewards, miles, etc. Having thus described embodiments of the present disclosure, persons of ordinary skill in the art will recognize that changes may be made in form and detail without departing from the scope of the present disclosure. Thus, the present disclosure is limited only by the claims.

The invention claimed is:

1. A system comprising:
a non-transitory memory; and
one or more hardware processors coupled to the non-transitory memory and configured to read instructions from the non-transitory memory to cause the system to perform operations comprising:
providing an application on a mobile device of a user for performing mobile payment transactions for the user;
receiving, via the application, user credentials corresponding to a funding source associated with an entity;
in response to the receiving, establishing a link with the funding source by accessing a server associated with the entity;
obtaining user financial data associated with the funding source based at least on the established link, wherein the user financial data comprises a current balance of the funding source, income data representing one or more projected incomes for the funding source within a first time period, and expense data representing one or more projected expenses for the funding source within the first time period;
determining, based on the user financial data, a first projected spendable resource from the funding source according to a first projected time frame by computing a first projected impact of the income data and the expense data on the funding source within the first projected time frame;
determining, based on the user financial data, a second projected spendable resource from the funding source according to a second projected time frame by computing a second projected impact of the income data and the expense data on the funding source within the second projected time frame;
providing, through the application executed on the mobile device, an interactive interface comprising a presentation area that simultaneously presents the first and second projected spendable resources and an input interface that enables the user to submit desired expense information related to a potential purchase, wherein the presentation area comprises a first graphical element representing the first projected spendable resource and a second graphical element representing the second projected spendable resource, wherein the first graphical element has a first size corresponding to a first amount of the first projected spendable resource and the second graphical element has a second size corresponding to a second amount of the second projected spendable resource;
receiving, by the application via the interactive interface, the desired expense information related to the potential purchase, wherein the desired expense information comprises a cost of an item, and an intended purchase date; and
in response to receiving the desired expense information, automatically adjusting the first and second sizes of the first graphical element and the second graphical element, respectively, presented on the interactive interface to reflect determined impacts of the desired expense information on the first projected spendable resource and the second projected spendable resource;
in response to determining that the determined impacts of the desired expense information comprise at least one of a first negative projected spendable resource or a second negative projected spendable resource, (i) providing, on the interactive interface, an alert indicating a modified intended purchase date for the potential purchase and (ii) presenting an interactive element on the interactive interface for performing a payment transaction based on the desired expense information and the modified intended purchase date, wherein an impact of purchasing the item on the modified intended purchase date comprises a first positive projected spendable resource and a second positive projected spendable resource; and
in response to receiving a user input via the interactive element, scheduling a processing of the payment transaction using the linked funding source based on the cost and the modified intended purchase date.

2. The system of claim 1, wherein the income data comprises at least one income amount having an associated frequency.

3. The system of claim 1, wherein the first amount of the first projected spendable resource represents an amount left in the funding source when the first projected time frame ends.

4. The system of claim 1, wherein the expense data comprises at least one recurring expense amount having an associated frequency.

5. The system of claim 1, wherein the user financial data further comprises an account number and a transaction history of the funding source.

6. The system of claim 1, wherein the operations further comprise prompting, via the interactive interface the user to enter, via the input interface, a dollar amount and a date on which the dollar amount is to be spent.

7. The system of claim 1, wherein the adjusted first and second graphical elements indicate whether the desired expense information is or is not affordable, or that the desired expense information is affordable at a later time.

8. A method comprising:
receiving, via an application on a mobile device of a user configured to perform mobile payment transactions for the user, user credentials corresponding to a funding source associated with an entity;
in response to the receiving, establishing, by the one or more hardware processors, a link with the funding source by accessing a server associated with the entity;
obtaining, by the one or more hardware processors, user financial data associated with the funding source based at least in part on the established link, wherein the user financial data comprises a current balance of the funding source, income data representing one or more projected incomes for the funding source within a first time period, and expenses data representing one or more projected expenses for the funding source within the first time period;
determining, by the one or more hardware processors based on the user financial data, a first projected spendable resource according to a first projected time frame by computing a first projected impact of the income data and the expense data on the funding source within the first projected time frame;
determining, based on the user financial data, a second projected spendable resource from the funding source according to a second projected time frame by computing a second projected impact of the income data and the expense data on the funding source within the second projected time frame;
providing, by the one or more hardware processors through the application executed on the device, an interactive interface comprising a presentation area that simultaneously presents the first and second projected spendable resources and an input interface that enables the user to submit desired expense information related to a potential purchase, wherein the presentation area comprises a first graphical element representing the first projected spendable resource and a second graphical element representing the second projected spendable resource, wherein the first graphical element has a first size corresponding to a first amount of the first projected spendable resource and the second graphical element has a second size corresponding to a second amount of the second projected spendable resource;
receiving, by the one or more hardware processors via the interactive interface of the application, the desired expense information related to the potential purchase, wherein the desired expense information comprises a cost of an item and an intended purchase date;
in response to receiving the desired expense information, automatically adjusting, by the one or more hardware processors, the first and second sizes of the first graphical element and the second graphical element, respectively, presented on the interactive interface to reflect determined impacts of the desired expense information on the first projected spendable resource and the second projected spendable resource;
in response to determining that the determined impacts of the desired expense information comprise at least one of a first negative projected spendable resource or a second negative projected spendable resource, (i) providing, by the one or more hardware processors on the interactive interface, an alert indicating a modified intended purchase date for the potential purchase and (ii) presenting, by the one or more hardware processors, an interactive element on the interactive interface for performing a payment transaction based on the desired expense information and the modified intended purchase date, wherein an impact of purchasing the item on the modified intended purchase date comprises a first positive projected spendable resource and a second positive projected spendable resource; and
in response to receiving a user input via the interactive element, scheduling a processing of the payment transaction using the linked funding source based on the cost and the modified intended purchase date.

9. The method of claim 8, wherein the first projected time frame ends before at least one of the one or more projected income is scheduled and wherein the second projected time frame is longer than the first time frame.

10. The method of claim 8, wherein receiving the desired expense information via the input interface comprises causing a scanner of the device to scan product information associated with the potential purchase.

11. A non-transitory machine-readable medium having stored thereon machine-readable instructions executable to cause a machine to perform operations comprising:
providing an application on a mobile device of a user for performing mobile payment transactions for the user;
receiving, via the application, user credentials corresponding to a funding source associated with an entity;
in response to the receiving, establishing a link with the funding source by accessing a server associated with the entity;
obtaining user financial data associated with the funding source based at least in part on the established link, wherein the user financial data comprises a current balance of the funding source, income data representing one or more projected incomes for the funding source within a first time period, and expense data representing one or more projected expenses for the funding source within the first time period;
determining, based on the user financial data, a first projected spendable resource from the funding source according to a first projected time frame by computing a first projected impact of the income data and the expense data on the funding source within the first projected time frame;
determining, based on the user financial data, a second projected spendable resource according to a second projected time frame by computing a second projected impact of the income data and the expense data on the funding source within the second projected time frame;
providing, through the application executed on the device, an interactive interface comprising a presentation area that simultaneously presents the first and second projected spendable resources and an input interface that enables the user to submit desired expense information related to a potential purchase, wherein the presentation area comprises a first graphical element representing the first projected spendable resource and a second graphical element representing the second projected spendable resource, wherein the first graphical element has a first size corresponding to a first amount of the first projected spendable resource and the second graphical element has a second size corresponding to a second amount of the second projected spendable resource;

receiving, via the interactive interface, the desired expense information related to the potential purchase, wherein the desired expense information comprises a cost of an item and an intended purchase date;

in response to receiving the desired expense information, automatically adjusting the first and second sizes of the first graphical element and the second graphical element, respectively, on the interactive interface to reflect determined impacts of the desired expense information on the first projected spendable resource and the second projected spendable resource;

in response to determining that the determined impacts of the desired expense information comprise at least one of a negative first projected spendable resource or a negative second projected spendable resource, (i) providing, on the interactive interface, an alert indicating a modified intended purchase date for the potential purchase and (ii) presenting an interactive element on the interactive interface for performing a payment transaction based on the desired expense information and the modified intended purchase date, wherein an impact of purchasing the item on the modified intended purchase date comprises a positive first projected spendable resource and a positive second projected spendable resource; and in response to receiving a user input via the interactive element, processing the payment transaction according to the modified intended purchase date using the linked funding source.

12. The non-transitory computer-readable medium of claim 11, wherein the operations further comprise determining the impact of the desired expense information on the first projected spendable resource, wherein determining the impact comprises:
  determining whether the intended purchase date is within the first projected time frame;
  in response to a determination that the intended purchase date is within the first projected time frame, computing a projected balance for the funding source based on the current total balance of the funding source, at least one of the one or more projected incomes scheduled within the first projected time frame, at least one of the one or more projected expenses scheduled within the first projected time frame, and the cost of the potential purchase; and
  updating the first amount based on the determined projected balance.

13. The system of claim 1, wherein the first amount of the first projected spendable resource represents a first projected balance of the funding source when the first projected time frame ends based on the user financial data and wherein the second amount of the second projected spendable resource represents a second projected balance of the funding source when the second projected time frame ends based on the user financial data.

14. The system of claim 1, wherein the operations further comprise obtaining, from a biometric scanner of the device, biometric data of the user, wherein obtaining the user financial data is based on the obtained biometric data.

15. The system of claim 1, wherein the operations further comprise determining the impact of the desired expense information on the first projected spendable resource, wherein determining the impact comprises:
  determining whether the intended purchase date is within the first projected time frame;
  in response to a determination that the intended purchase date is within the first projected time frame, computing a projected balance for the first projected time frame based on the current balance of the funding source, at least one of the one or more projected incomes scheduled within the first projected time frame, at least one of the one or more projected expenses scheduled within the first projected time frame, and the cost of the potential purchase; and
  updating the first amount based on the determined projected balance.

16. The system of claim 15, wherein the first size of the first graphical element is adjusted on the interactive interface based on the updated first amount.

17. The method of claim 8, wherein the first amount of the first projected spendable resource represents a first projected balance in the first projected time frame based on the user financial data and wherein the second amount of the second projected spendable resource represents a second projected balance in the second projected time frame based on the user financial data.

18. The method of claim 8, further comprising determining the impact of the desired expense information on the first projected spendable resource, wherein determining the impact comprises:
  determining whether the intended purchase is within the first projected time frame;
  in response to a determination that the intended purchase date is within the first projected time frame, calculating, by the one or more hardware processors, a projected balance of the funding source for the first projected time frame based on the current balance of the funding source, at least one of the one or more projected incomes scheduled within the first projected time frame, at least one of the one or more projected expenses scheduled within the first projected time frame, and the cost of the potential purchase; and
  updating the first amount based on the determined projected balance.

19. The system of claim 1, wherein the desired expense information related to the potential purchase is received either by obtaining data wirelessly from a Near Field Communication (NFC) device of a product or by scanning an image of a code associated with the product.

20. The system of claim 1, wherein the operations further comprise processing the scheduled payment transaction using the linked funding source on the modified intended purchase date.

* * * * *